(12) United States Patent
Guo et al.

(10) Patent No.: US 8,688,852 B2
(45) Date of Patent: Apr. 1, 2014

(54) SUPPORT FOR INTERACTIVE PLAYBACK DEVICES FOR PERFORMANCE AWARE PEER-TO-PEER CONTENT-ON-DEMAND

(75) Inventors: Yang Guo, Plainsboro, NJ (US); Saurabh Mathur, Monmouth Junction, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 834 days.

(21) Appl. No.: 12/227,961

(22) PCT Filed: Jun. 27, 2006

(86) PCT No.: PCT/US2006/024975
§ 371 (c)(1),
(2), (4) Date: Dec. 3, 2008

(87) PCT Pub. No.: WO2008/002296
PCT Pub. Date: Jan. 3, 2008

(65) Prior Publication Data
US 2009/0202221 A1 Aug. 13, 2009

(51) Int. Cl.
*G06F 15/16* (2006.01)
(52) U.S. Cl.
USPC .......................................... 709/231; 709/232
(58) Field of Classification Search
USPC .............................................. 709/229–231
See application file for complete search history.

(56) References Cited

U.S. PATENT DOCUMENTS

| | | | |
|---|---|---|---|
| 6,949,022 B1 * | 9/2005 | Showers et al. | 463/16 |
| 7,672,235 B1 * | 3/2010 | Lian et al. | 370/230 |
| 7,698,386 B2 * | 4/2010 | Amidon et al. | 709/219 |
| 7,809,388 B1 * | 10/2010 | Othmer | 455/518 |
| 7,983,196 B2 * | 7/2011 | Yanagihara | 370/255 |
| 8,005,889 B1 * | 8/2011 | Issa et al. | 709/201 |
| 8,231,462 B1 * | 7/2012 | Showers et al. | 463/29 |
| 2002/0114465 A1 | 8/2002 | Shen-Orr et al. | |
| 2002/0191952 A1 * | 12/2002 | Fiore et al. | 386/46 |
| 2003/0009577 A1 * | 1/2003 | Apostolopoulos et al. | 709/231 |
| 2003/0065712 A1 * | 4/2003 | Cheung et al. | 709/203 |
| 2003/0152034 A1 * | 8/2003 | Zhang et al. | 370/252 |
| 2004/0010593 A1 * | 1/2004 | Apostolopoulos et al. | 709/226 |
| 2004/0210663 A1 * | 10/2004 | Phillips et al. | 709/230 |
| 2004/0225713 A1 | 11/2004 | Abbasi et al. | |

(Continued)

FOREIGN PATENT DOCUMENTS

WO WO03088561 10/2003

OTHER PUBLICATIONS

Gao, Yang, et. al. "Supporting VCR Operation in a Mesh-Based PSP VoD System." Consumer Communicatins and Networking Conference, 2008. CCNC 2008. 5th IEEE, IEEE CCP, Piscataway, NJ. Jan. 1, 2008. XP031211916.

(Continued)

*Primary Examiner* — Ninos Donabed
(74) *Attorney, Agent, or Firm* — Robert D. Shedd; Jeffrey M. Navon (57) ABSTRACT

A method and apparatus are described comprising detecting a playback operation, determining a target playback point for the playback operation and detecting a sub-clip type into which the target playback point falls. The method and apparatus also receive a streamed leading sub-clip, determine a set of needed sub-clips, locate one of the set of needed sub-clips and download the located sub-clip.

14 Claims, 6 Drawing Sheets

(56) References Cited

U.S. PATENT DOCUMENTS

| | | | | |
|---|---|---|---|---|
| 2005/0108203 | A1* | 5/2005 | Tang et al. | 707/3 |
| 2005/0119976 | A1* | 6/2005 | Taylor et al. | 705/52 |
| 2005/0138192 | A1* | 6/2005 | Encarnacion et al. | 709/230 |
| 2005/0210394 | A1* | 9/2005 | Crandall et al. | 715/752 |
| 2005/0262257 | A1* | 11/2005 | Major et al. | 709/231 |
| 2006/0010225 | A1* | 1/2006 | Issa | 709/217 |
| 2006/0136551 | A1* | 6/2006 | Amidon et al. | 709/203 |
| 2006/0209701 | A1* | 9/2006 | Zhang et al. | 370/249 |
| 2006/0242240 | A1* | 10/2006 | Parker et al. | 709/205 |
| 2007/0094272 | A1* | 4/2007 | Yeh | 707/10 |
| 2007/0094405 | A1* | 4/2007 | Zhang | 709/231 |
| 2007/0174246 | A1* | 7/2007 | Sigurdsson et al. | 707/3 |

OTHER PUBLICATIONS

Luo, Jian-Guang, et al. "Chasing: An Efficient Streaming Mechanism for Scalable and Resilient Video-On-Demand Service Over Peer-to-Peer Networks." Networking Technologies, Services, and Protocols; Performance of Computer and Communication Networks; Mobile and Wireless Communications Systems Lecture Notes in Computer Science; LNCE, Springer, Berlin, DE, vol. 3976, Jun. 11, 2006, pp. 642-653, XP019030868.

Sharma, Abhishek, et al. "dPAM: A Distributed Prefetching Protocol for Scalable Asynchronous Multicast in P2P Systems." INFOCOM2005. 24th Annual Joint Conference of the IEEE Computer and Communications Societies, Proceedings IEEE Miami, FL, USA Mar. 13-17, 2005, Piscataway, NJ, IEEE, Piscataway NJ USA, vol. 2, Mar. 13, 2005, pp. 1139-1150, XP010829219.

Yiu, W. P. Ken, et al. "Distributed Storage to Support User Interactivity in Peer-to-Peer Video Streaming." Communications, 2006. ICC '06. IEEE International Conference on, IEEE, PI Jun. 1, 2006, pp. 55-60, XP031025030.

Zheng, Changxi, et al. "Distributed Prefetching Scheme for Random Seek Support in Peer-to-Peer Streaming Applications." P2PMMS '05, Nov. 11, 2005. Singapore. XP40030475A 1.

Supplementary European Search Report for Application No. EP 06 77 4101. Dated Aug. 11, 2009.

Yiu et al., "Distributed Storage to Support User Interactivity in Peer-to-Peer Video Streaming," Proc. of IEEE Int'l. Conference on Communications (ICC'06), Jun. 11, 2006, pp. 55-60.

* cited by examiner

The playback time of the start of the sub-clip is defined as the deadline of this sub-clip. The leading sub-clips are streamed to the video playback device so that the users can start the playback immediately. Meanwhile, a peer-to-peer network is established among users in order to pre-fetch the data of the succeeding sub-clips. In accordance with the system performance aware scheme of the present invention, the data of a sub-clip has to be pre-fetched before its deadline. Once the playback of a sub-clip has started, no peer-to-peer downloading of that sub-clip is allowed since the newly downloaded data may be outdated. Complementary streaming from the original server is initiated from this point on for better system performance. Complementary streaming is described below.

An example is used to illustrate how segmented peer-to-peer video-on-demand serves incoming requests. In this example, it is assumed that users are able to cache the entire copy of the video. The same technique applies even if only a portion of the video copy is cached. It is further assumed that the server only streams the first sub-clip and the data of following sub-clips are downloaded using the peer-to-peer network. The algorithm to compute the number of streamed sub-clips will be presented and described below.

Figure 1:
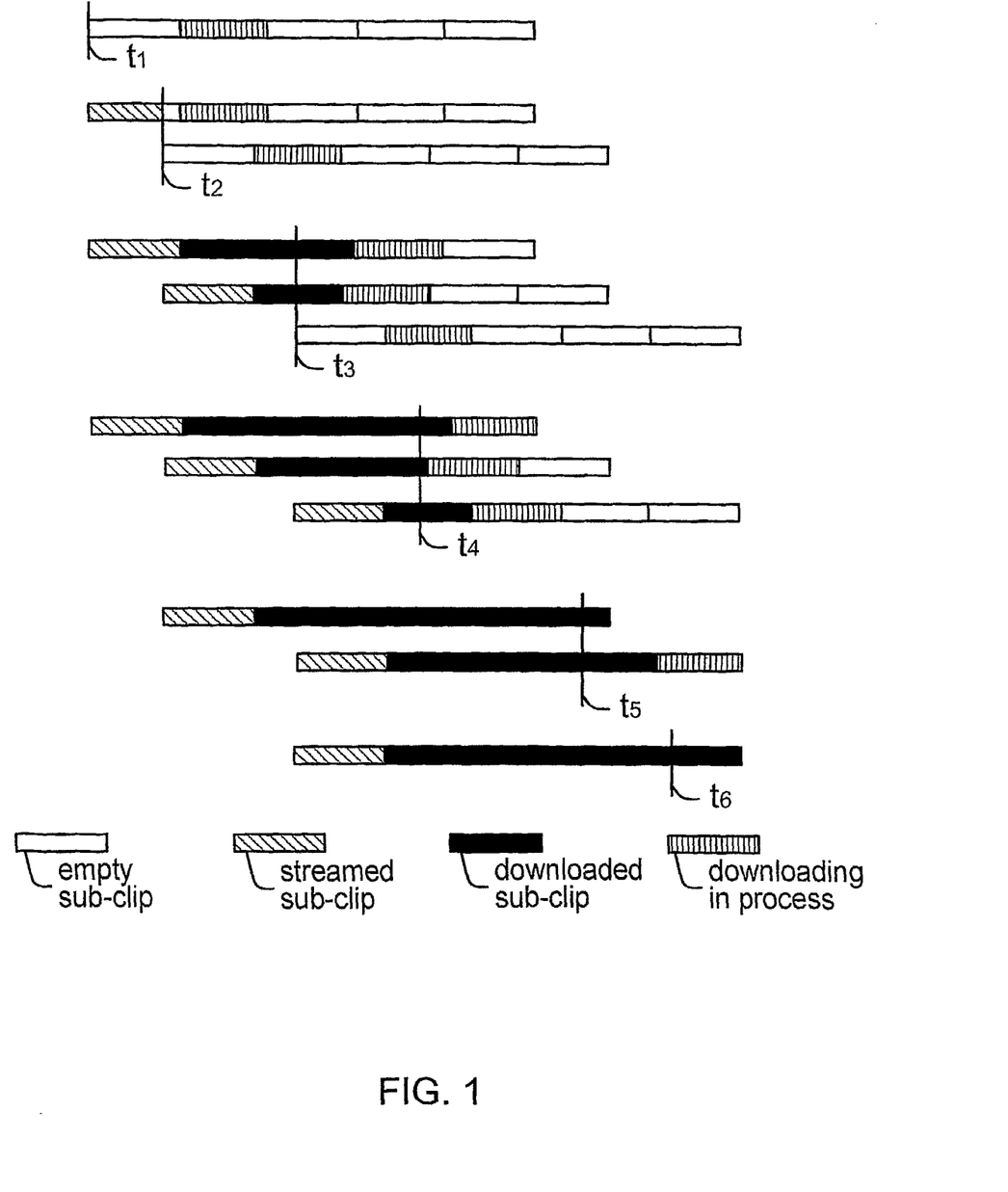

Referring now to FIG. 1, client/user 1 makes a request/demand for video from the server at time $t_1$. The server streams sub-clip 1 (the first video sub-clip) to client 1 immediately, so that client 1 can promptly commence playback. At the same time an attempt is made to locate a peer having/caching sub-clip 2 within the peer-to-peer network. At this moment, the only peer in the peer-to-peer network having/caching sub-clip 2 is the server, which can behave as a peer. Both client 1 and the server (at the least) are members of the peer-to-peer network. At time $t_2$, client 1 is playing back sub-clip 1, while sub-clip 2 is being downloaded (not streamed) from the server. Client/user 2 makes a request/demand for the same video from the server and immediately commences playback of sub-clip 1, which was streamed from the server to client 2. Both the server and client 1 commence downloading (not streaming) sub-clip 2 to client 2. At this moment, the server, client 1, and client 2 are peers in the peer-to-peer network. At time $t_3$, client 3 makes a request/demand for the same video from the server and immediately commences playback of sub-clip 1, which was streamed from the server. By now client 1 is playing back sub-clip 3 and is downloading the data/video of sub-clip 4. Client 2 is playing sub-clip 2 and downloading sub-clip 3. At this time, the server, client 1, client 2 and client 3 (at least) are members of the peer-to-peer network. Client 3 can download sub-clip 2 from the server, client 1, and client 2. As time progresses, peer video playback continues. The peer-to-peer downloading pre-fetches the data of the sub-clip that follows the sub-clip currently being played, as show in FIG. 1 with current time of $t_4$. By time $t_5$, client 1 has already finished its video playback and exited the system. Client 2 is playing back the last sub-clip and client 3 is playing back sub-clip 4 and downloading sub-clip 5. The server and the second client are peers in the peer-to-peer network for purposes of downloading sub-clip 5. At last, client 2 has also exited the system after finishing the video playback. Client 3 is watching/playing back sub-clip 5 and will exit the system at the end of sub-clip 5.

As discussed above, although extra care is taken to address the performance issues (timely arrival of the sub-clips at/by the user), some data may still be missing by the time of deadline (or shortly before the deadline) when peer-to-peer downloading ceases. How to use the server to stream the missing data so as to further improve the peer video playback performance is now described. This is called complementary streaming herein. As the deadline approaches, the peer client prepares a missing data vector $V_{missing}$, which is a bit map that uses a first flag, for example "1" to indicate that a block is received, and a second flag, for example "0" to indicate a block is still missing. The missing data vector is sent to the server (signaling). The server starts to stream out the missing data at the normal playback rate as the deadline approaches so that the missing data/video can be filled in time for the peer video playback.

Supporting user interactivity, i.e., video device playback operations, is an important aspect of video-on-demand service. Users invoking jump forward/backward operations want to playback the video from an arbitrary point inside the clip at the normal playback rate. Letting the target playback point, or TPP denote the intended new playback point. If TPP is later than the current playback point, it is a jump forward operation. Otherwise, it is a jump backward operation.

As shown above in FIG. 1, there exist four types of sub-clips in performance aware peer-to-peer video-on-demand service: empty sub-clips, downloaded sub-clips, downloading in-process sub-clips, and streamed sub-clips. Depending on the type of sub-clip the target playback point (TPP) falls into, the jump forward/backward operations are handled differently. In the following, how to compute the maximum number of sub-clips that may need to be streamed from the server directly is described first. The actual number of streamed sub-clips, based on the type of sub-clip that TPP falls into and the types of following sub-clips are also described. Finally, how to modify the sub-clip deadlines in order to support jump forward/backward operations is described.

The number of streamed sub-clips is maximized when no data after the target playback point (TPP) is cached in the buffer. In such scenario, supporting jump forward/backward operations is similar to starting a new video from the TPP. Suppose the TPP falls into sub-clip i. Below the method to compute the maximum number of streamed sub-clips is described, assuming no data is cached for the sub-clip k, for k>i.

The time interval from the TPP to the end of sub-clip i is denoted by $t_{leftover}$, and the maximum number of streamed sub-clips is denoted by n*. Thus, the relationship $$(r_{downlink} - r_{playback})(t_{leftover} + n^*L) \geq r_{playback}L$$

where $r_{downlink}$ is the downlink speed, $r_{playback}$ is the playback rate, and L is the duration of the sub-clip is derived. Since n* has to be an integer, and has to be no greater than the total number of sub-clips after the sub-clip i, $$n^* = \min\left\{ \left\lceil \frac{\left(r_{playback}L - (r_{downlink} - r_{playback})t_{leftover}\right)^+}{(r_{downlink} - r_{playback})L} \right\rceil, N - i \right\} \quad \text{(Equation 1)}$$

where $(.)^+$ is a non-negative function, and N is the total number of sub-clips.

Next the actual number of sub-clips needed to be streamed is investigated. There are four types of sub-clips in performance aware peer-to-peer video-on-demand service: empty sub-clip, downloaded sub-clip, streamed sub-clip, and downloading-in-process sub-clip. Both streamed sub-clips and downloading-in-process sub-clips cache portions of the sub-clip data so are treated herein the same as empty sub-clips. This simplifies the problem and a conservative number of streamed sub-clips is, thus, computed. Applying complementary streaming if a portion of the data is available in the buffer is recommended.

Figure 2:
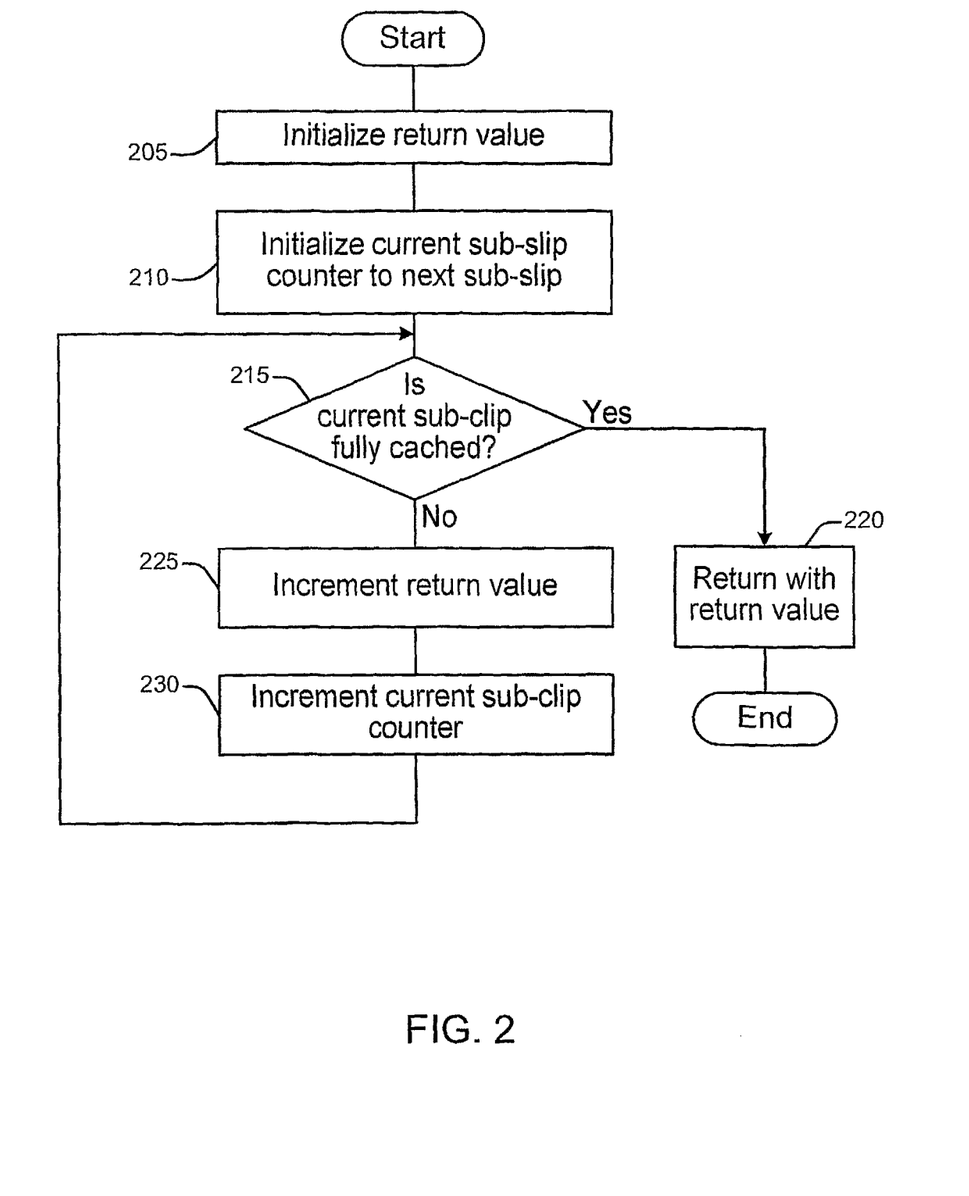

FIG. 2 is a flowchart of the process to calculate the actual number of streamed sub-clips for fast forward, jump forward and jump backward operations. The return value is initialized at 205. The current sub-clip counter is initialized to the next sub-clip at 210. A determination is made at 215 if the current sub-clip is fully cached. If the current sub-clip is fully cached then return with the return value at 220. If the current sub-clip is not fully cached then increment the return value at 225 and then increment the current sub-clip counter at 230. The process essentially loops through the n sub-clips. If the sub-clip k is fully cached, the entire downlink bandwidth is available to download the data of the next empty sub-clip. Since downlink speed is always larger than the playback rate (otherwise no video-on-demand service can be provided in the first place), the empty sub-clip will be fully downloaded before its deadline. Therefore, any empty sub-clips after the sub-clip k can be downloaded before their deadlines, and no direct streaming is required.

Next, how to adjust the sub-clip deadlines to accommodate jump forward/backward operations is considered. Let t denote the current time, and $\overline{d}^k$ denote the new deadline of k-th sub-clip. Then, the following equation is derived $$\overline{d}^k = t + t_{leftover} + (k-i-1)L \quad \text{(Equation 2)}$$

for i≤k≤N, where L is the duration of a sub-clip.

Supporting the pause operation in performance aware peer-to-peer video-on-demand service is straightforward—just stop the video playback and pause any ongoing streaming or downloading. The sub-clip deadlines are changed to be infinite to postpone the downloading process. Note that the pause operation only occurs in streamed sub-clips and downloaded sub-clips.

The resume operation is handled differently depending upon the type of sub-clip. Suppose that the video is paused at sub-clip i. If the current sub-clip is a streamed sub-clip, the user via the video playback device signals the server to resume the playback. The server also resumes streaming the sub-clips that had been designated to be streamed before the pause operation was invoked. The rationale behind this is that all the actions are temporarily suspended by the pause operation, and the resume operation re-starts the streaming without changing the system status. Meanwhile, the sub-clip deadlines are modified to reflect the elapsed time incurred by the pause operation. Suppose that the playback time from the resumption point to the beginning of the following sub-clip i+1 is $t_{leftover}$, and the current time is t, equation (2) is used to compute the new deadlines.

If the pausing point falls in a downloaded sub-clip, the user via the video playback device resumes the playing of current sub-clip immediately, resumes the downloading process, and the deadlines of following sub-clips are modified using equation (2) as well.

For the fast forward operation, the video is played back at a higher rate than the normal playback rate. The speedup factor of the fast forward operation is denoted by δ. The playback rate for the fast forward operation is $\delta \cdot r_{playback}$.

In the following, the maximum number of streamed sub-clips, n* is calculated first. Then the actual number of streamed sub-clips is calculated. Finally, modification of the sub-clip deadlines is performed. It will become obvious that there is a strong correlation between jump forward operation and fast forward operation.

The time interval from the starting playback point to the end of current sub-clip is denoted by $t_{leftover}$. The playback rate for the fast forward operation is denoted as $r'_{playback}$, i.e., $r'_{playback} = \delta \cdot r_{playback}$. Thus, the following relationship is derived $$(r_{downlink} - r'_{playback})(t_{leftover} - n^*L)/\delta \geq r'_{playback}L \quad \text{(Equation 3)}$$

It should be noted that the second term on the left hand side of equation (3) is divided by δ to reflect the fact that the playback rate is sped up by a factor of δ. Since n* has to be an integer and no larger than N−i, the following relationship can be derived $$n^* = \min\left\{ \left\lceil \frac{\left(r_{playback}L\delta - (r_{downlink} - r'_{playback})t_{leftover}\right)^+}{(r_{downlink} - r'_{playback})L} \right\rceil, N-i \right\} \quad \text{(Equation 4)}$$

The method of FIG. 2 can be applied to find the actual number of streamed sub-clips. The adjusted deadline for sub-clip k, i≤k≤N, is thus $$\overline{d}^k = t + (t_{leftover} + (k-i-1)L)/\delta \quad \text{(Equation 5)}$$

The leftover time for the fast reverse operation is the time interval from the current playback point to the beginning of current sub-clip. Using $t_{leftover}$ to denote the leftover time for the fast reverse operation, the maximum number of streamed sub-clips is:

$$n^* = \min\left\{ \left\lceil \frac{\left(r_{playback}L\delta - (r_{downlink} - r'_{playback})t_{leftover}\right)^+}{(r_{downlink} - r'_{playback})L} \right\rceil, i-1 \right\} \quad \text{(Equation 6)}$$

Equation 4 and equation 6 are similar except for the last term, which can be explained by the opposite playback directions. It should also be noted that both fast forward and fast reverse operations can be implemented for multiple speeds in either direction.

The method illustrated in FIG. 2 only needs to be modified slightly to compute the actual number of streamed sub-clips for the fast reverse operation. More specifically, k is looped backward (decremented) from i−1 to i−n* in step 230.

The deadline for sub-clip k, 1<k<i, can be calculated as follows:

$$\overline{d}^k = t + (t_{leftover} + (i-k-1)L)/\delta \quad \text{(Equation 7)}$$

Figure 3:
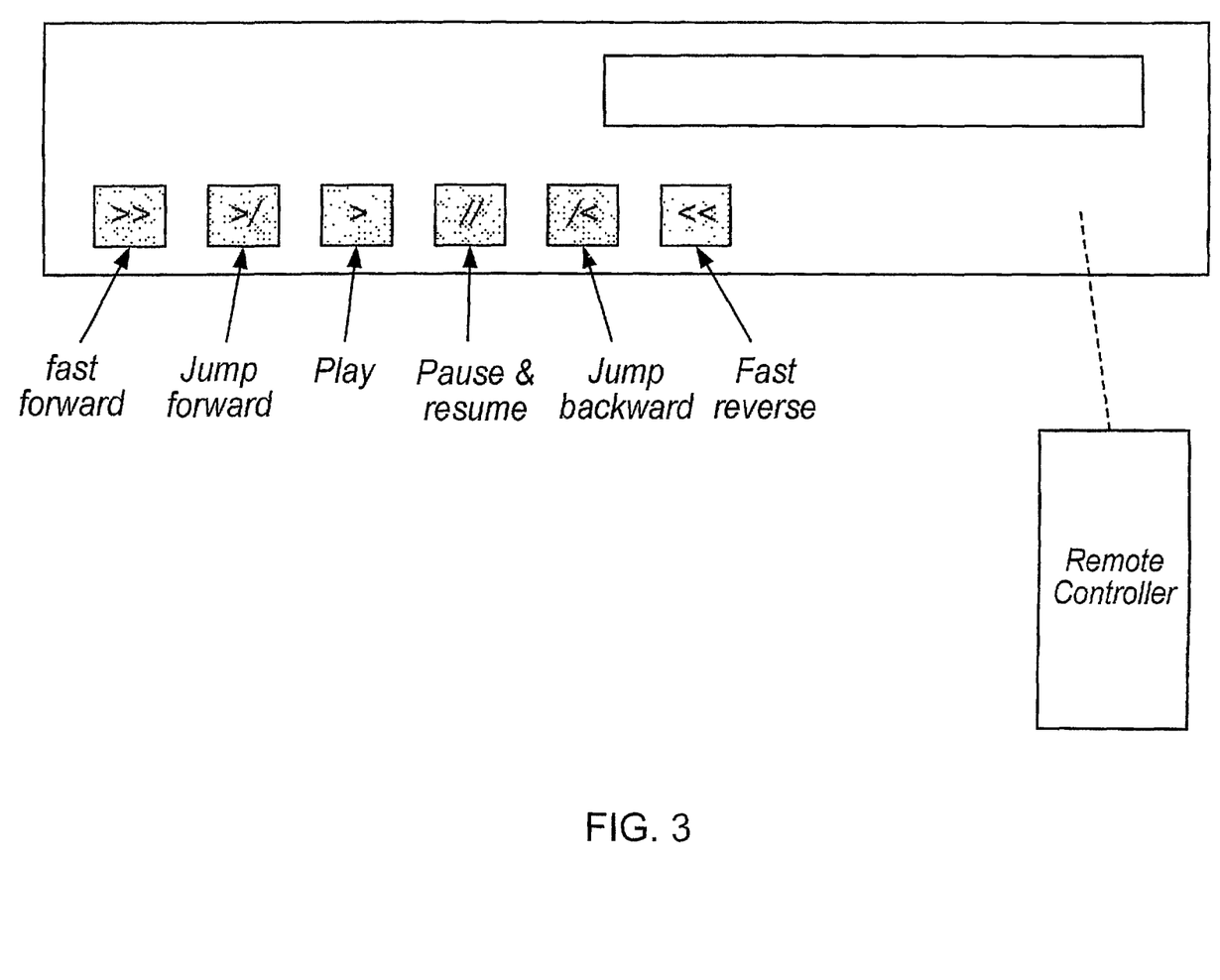

FIG. 3 is a schematic diagram of a video playback device. Video playback operations are supported through a button on the video playback device or via a button activated by a user of a remote control device or a software command activated, for example, by a voice command. The means for invoking the video playback operations are not limited to those suggested above, which are merely illustrative embodiments of such means for invoking video playback operations.

Figure 4:
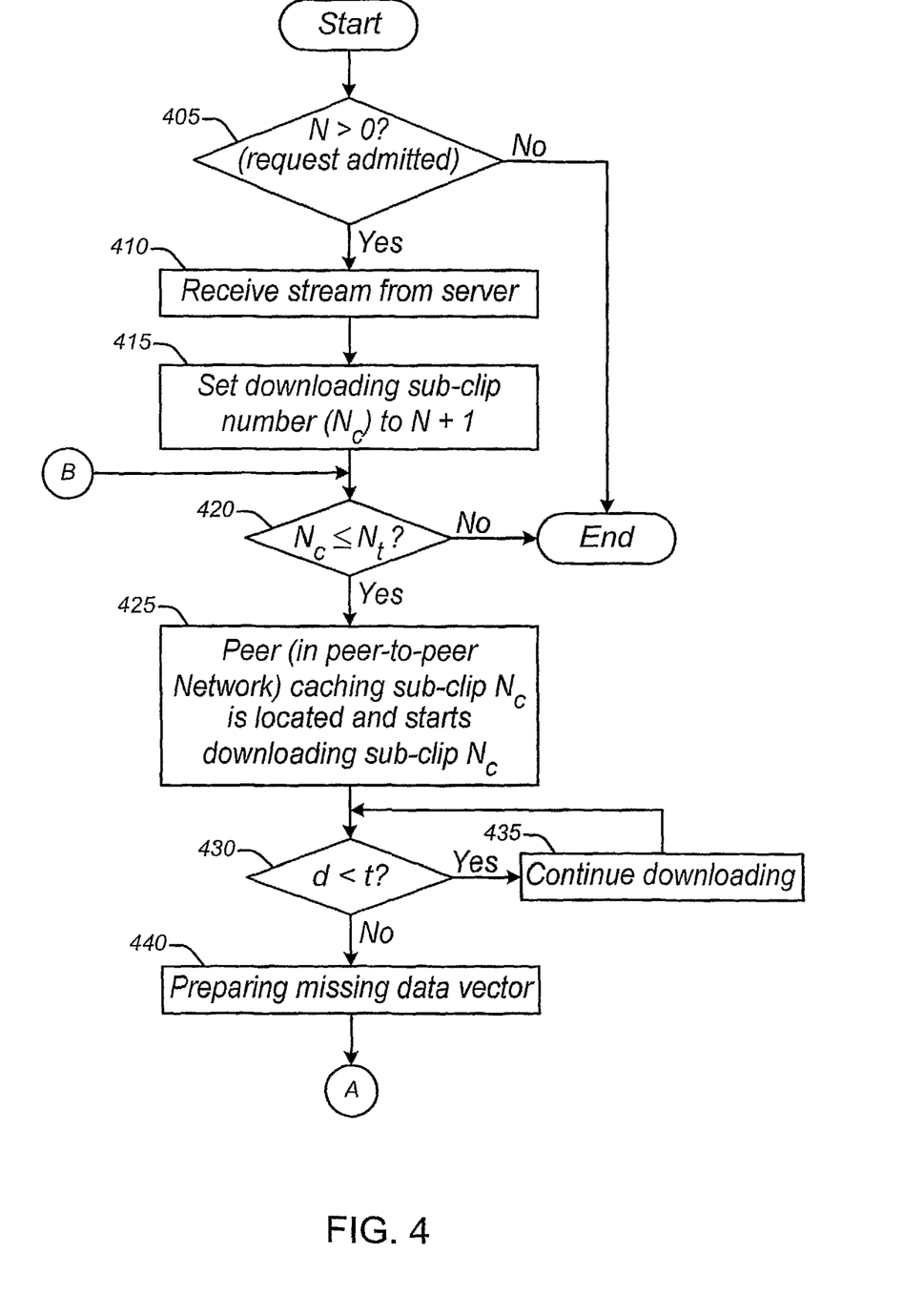

FIG. 4 is a flowchart depicting the admission control process from the user/client side. At the user/client side, once the client receives the response from the server, a check is made to determine if the request/demand has been admitted by testing the value of N (the leading number of sub-clips to be streamed to the client from the server) at 405. If the value of N is greater than zero then the request/demand has been admitted and the user starts to receive the streamed N sub-clips at 410. It should be noted that setting N=−1 on the server side and testing for N>0 on the user/client side is but one possible implementation. The request admission test could, for example, be implemented by means of a flag or any other suitable means. The current sub-clip number, $N_c$, is set to N+1 (the next sub-clip—the sub-clip to be downloaded) at 415. A test is then performed at 420 to determine if there are more sub-clips to download. If either the request/demand was not admitted or all sub-clips of the video have been received by the user then the process ends. Meanwhile, a peer within the peer-to-peer network having/caching the (N+1)-st sub-clip is located and starts uploading the (N+1)-st sub-clip to the peer needing the (N+1)-st sub-clip at 425. If it is determined that the deadline, d, for the download (measured against the current time, t) has not been reached at 430 then the downloading continues at 435. If it is determined that the deadline, d, has been reached (as measured against the current time, t) at 430 then a missing data vector is prepared at 440. Actually the missing data vector is prepared slightly before the deadline or when it is determined that the download cannot be completed before the deadline, d. If the download cannot be completed before the deadline then a test is performed to determine if complementary streaming is necessary at 445. Complementary streaming will be described in greater detail below. Meanwhile, the current sub-clip counter is incremented at 455. If complementary streaming is required to ensure system performance (arrival of sub-clips by the user before the deadlines) is met then complementary streaming is invoked at 450. As the deadline, d, for downloading the (N+1)-st sub-clip is reached, the user starts to playback the (N+1)-st sub-clip and a peer within the peer-to-peer network having/caching the following sub-clip is located and starts the video sub-clip downloading process.

Figure 5:
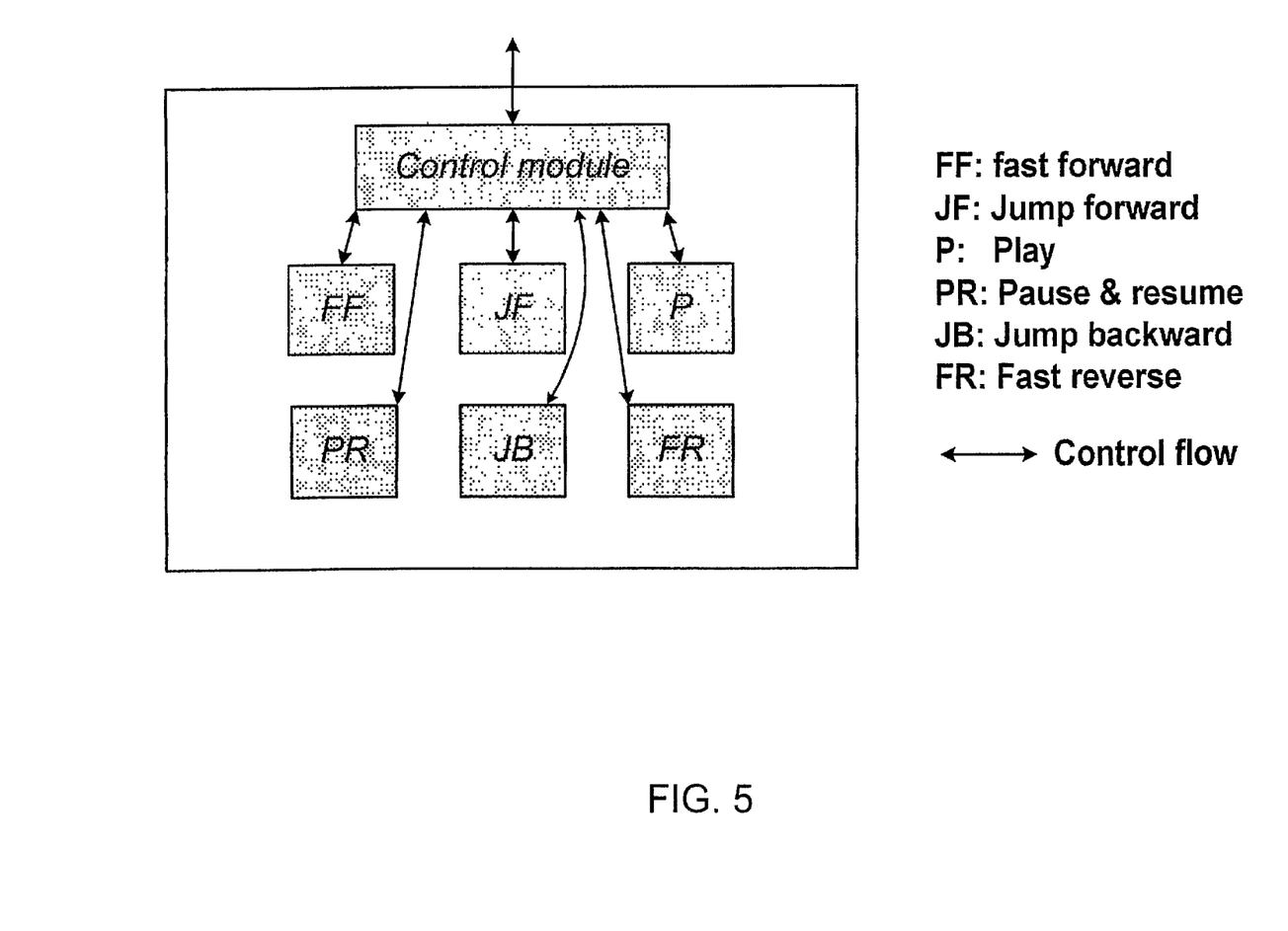

FIG. 5 is a block diagram of the video playback operations within a video playback device, where the operational modules are directed by a control module. The control module calls/invokes the corresponding video playback functional/operation modules for any playback requests. It should be noted that a straight playback operation is not discussed herein as it is the subject of a related operation.

Figure 6:
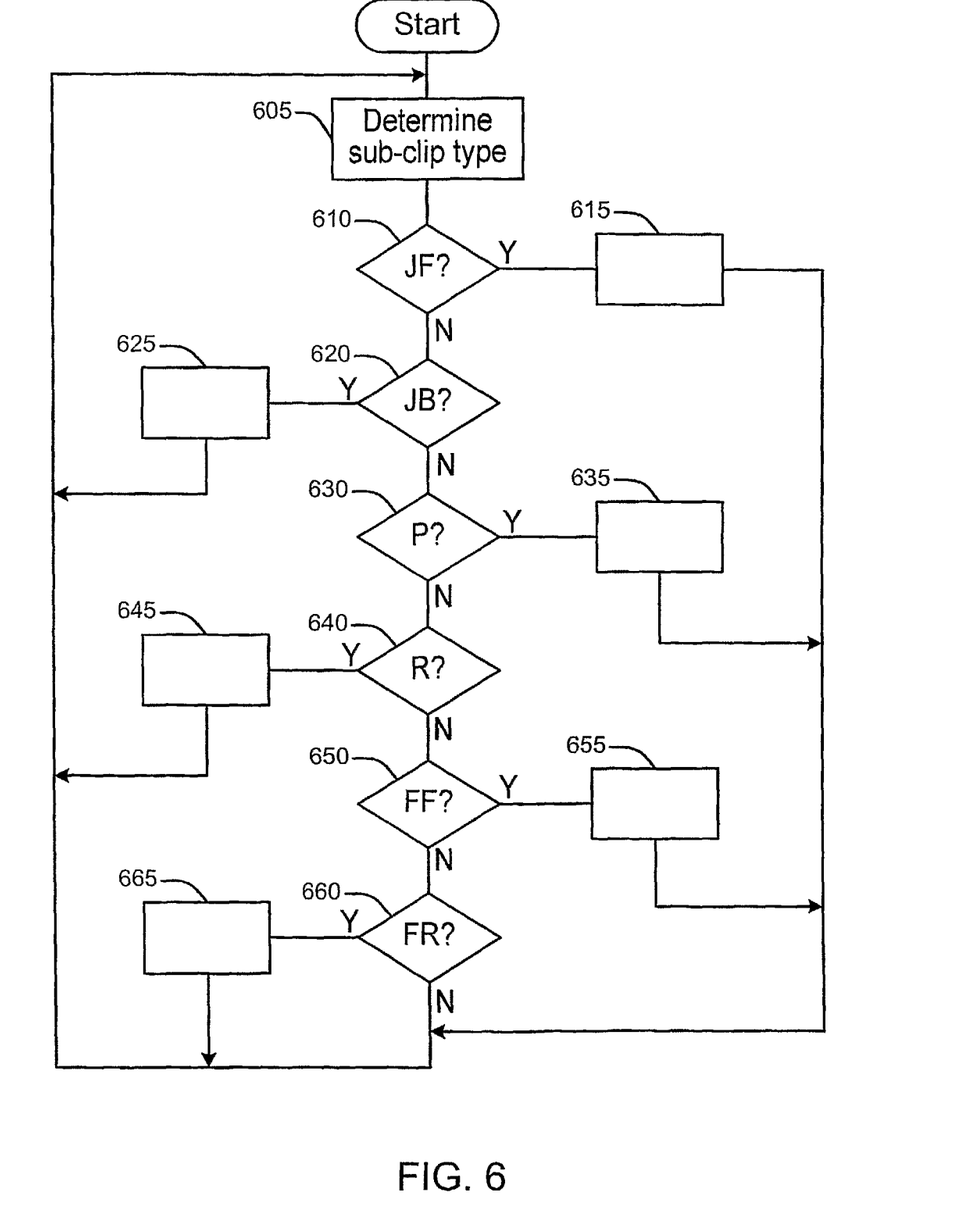

FIG. 6 is a flowchart of the operation of an exemplary control module in accordance with the present invention. The control module determines the sub-clip type at 605. The type of operation is determined by 610, 620, 630, 640, 650 and 660. If the user has pressed a button (or spoken a command) to invoke a function not supported then it is ignored. Instead of a series of decision points a single "case-type" decision point could be implemented. If the video playback operation is a jump forward (JF) then at 615 a determination of the maximum number of sub-clip necessary to stream is made; a determination of the actual number of sub-clips to be streamed is made based on what is already fully cached; streaming of the sub-clip containing the TPP is started (if the sub-clip containing the TPP is not fully cached); new sub-clip deadlines are calculated; playback is started; and downloading of sub-clips beyond the streamed sub-clips is started. The same procedure applies for the jump backward operation.

If the video playback operation is a pause operation then at 635 video playback is stopped; streaming is stopped; downloading is stopped; and the sub-clip deadlines are set to infinity. If the video playback operation is a resume operation then at 645 new sub-clip deadlines are calculated as a result of the pause operation; if sub-clip(s) were being streamed then resume streaming sub-clips; start video playback; and resume downloading any sub-clips that were scheduled to be downloaded.

If the video playback operation is a fast forward operation then at 655 a calculation is made of the new sped-up playback rate; a determination of the maximum number of sub-clip necessary to stream is made; a determination of the actual number of sub-clips to be streamed is made based on what is already fully cached; streaming of the sub-clip containing the TPP is started (if the sub-clip containing the TPP is not fully cached); new sub-clip deadlines are calculated; playback is started; and downloading of sub-clips beyond the streamed sub-clips is started. The similar procedure applies for the fast reverse operation, except Equation 6 replaces equation 4 in computing the actual number of streamed sub-clips. It should be remembered that both fast forward and fast reverse can be implemented for multiple speeds in either direction.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for supporting video playback operations for a peer-to-peer content-on-demand service, said method comprising:
    detecting a playback operation;
    determining a target playback point for said playback operation;
    detecting a sub-clip type into which said target playback point falls, wherein said target playback point is a new intended playback point upon receipt of said playback operation, and wherein said sub-clip type includes an empty sub-clip, a downloaded sub-clip, a streamed sub-clip, and a downloading-in-process sub-clip;
    receiving a streamed leading sub-clip from a server;
    determining a set of needed sub-clips;
    locating one of said set of needed sub-clips;
    downloading said located sub-clip;
    preparing a missing data vector as a playback deadline approaches;
    transmitting said missing data vector to a server; and
    receiving by complementary streaming missing data specified in said missing data vector from said server as said playback deadline approaches, wherein said peer-to-peer content-on-demand service is performance aware.

2. The method according to claim 1, wherein said playback operation is one of jump forward and further comprising:
    determining a maximum number of sub-clips to stream;
    determining an actual number of sub-clips to stream;

streaming a sub-clip containing said target playback point;
calculating sub-clip deadlines;
starting playback;
downloading sub-clips following said streamed sub-clip.

3. The method according to claim 1, wherein said playback operation is one of jump backward and further comprising:
determining a maximum number of sub-clips to stream;
determining an actual number of sub-clips to stream;
streaming a sub-clip containing a target playback point;
starting playback at a sub-clip containing a target playback point;
calculating sub-clip deadlines; and
downloading sub-clips following said streamed sub-clip.

4. The method according to claim 1, wherein said playback operation is one of pause and further comprising:
stopping playback;
stopping sub-clip streaming;
stopping sub-clip downloading; and
setting sub-clip deadlines to infinity.

5. The method according to claim 4, wherein said playback operation is one of resume and further comprising:
calculating new sub-clip deadlines;
resuming sub-clip streaming, if sub-clips were being streamed;
starting playback; and
resuming sub-clip downloading of any sub-clips that were being downloaded when said pause operation was invoked.

6. The method according to claim 1, wherein said playback operation is one of fast forward and further comprising:
calculating a sped-up playback rate;
determining a maximum number of sub-clips to stream;
determining an actual number of sub-clips to stream;
streaming sub-clips;
calculating sub-clip deadlines;
starting playback;
downloading sub-clips following said streamed sub-clip.

7. The method according to claim 1, wherein said playback operation is one of fast reverse and further comprising:
calculating a sped-up playback rate;
determining a maximum number of sub-clips to stream;
determining an actual number of sub-clips to stream;
streaming sub-clips;
starting playback;
calculating sub-clip deadlines; and
downloading sub-clips preceding said streamed sub-clip.

8. An apparatus for supporting video playback operations for a peer-to-peer content-on-demand service, comprising:
a memory for storing sub-clip types;
a control module for directing an operation module; and
an operation module which, when invoked by the control module:
detects a playback operation;
determines a target playback point for said playback operation wherein said target playback point is a new intended playback point upon receipt of said playback operation, and wherein said sub-clip type includes an empty sub-clip, a downloaded sub-clip, a streamed sub-clip, and a downloading-in-process sub-clip;
detects a sub-clip type into which said target playback point falls;
receives a streamed leading sub-clip from a server;
determines a set of needed sub-clips;
locates one of said set of needed sub-clips;
downloads said located sub-clip;
prepares a missing data vector as a playback deadline approaches;
transmits said missing data vector to a server; and
receives by complementary streaming missing data specified in said missing data vector from said server as said playback deadline approaches, wherein said peer-to-peer content-on-demand service is performance aware.

9. The apparatus according to claim 8, wherein said playback operation is one of jump forward and the operation module:
determines a maximum number of sub-clips to stream;
determines an actual number of sub-clips to stream;
streams a sub-clip containing said target playback point;
calculates sub-clip deadlines;
starts playback;
downloads sub-clips following said streamed sub-clip.

10. The apparatus according to claim 8, wherein said playback operation is one of jump backward and the operation module:
determining a maximum number of sub-clips to stream;
determining an actual number of sub-clips to stream;
streaming a sub-clip containing a target playback point;
starting playback at a sub-clip containing a target playback point;
calculating sub-clip deadlines; and
downloading sub-clips following said streamed sub-clip.

11. The apparatus according to claim 8, wherein said playback operation is one of pause and the operation module:
stops playback;
stops sub-clip streaming;
stops sub-clip downloading; and
sets sub-clip deadlines to infinity.

12. The apparatus according to claim 11, wherein said playback operation is one of resume and the operation module:
calculates new sub-clip deadlines;
resumes sub-clip streaming, if sub-clips were being streamed;
starts playback; and
resumes sub-clip downloading of any sub-clips that were being downloaded when said pause operation was invoked.

13. The apparatus according to claim 8, wherein said playback operation is one of fast forward and the operation module:
calculates a sped-up playback rate;
determines a maximum number of sub-clips to stream;
determines an actual number of sub-clips to stream;
streams sub-clips;
calculates sub-clip deadlines;
starts playback;
downloads sub-clips following said streamed sub-clip.

14. The apparatus according to claim 8, wherein said playback operation is one of fast reverse and the operation module:
calculates a sped-up playback rate;
determines a maximum number of sub-clips to stream;
determines an actual number of sub-clips to stream;
streams sub-clips;
starts playback;
calculates sub-clip deadlines; and
downloads sub-clips preceding said streamed sub-clip.

* * * * *